United States Patent [19]

Tsubouchi

[11] Patent Number: 4,894,990
[45] Date of Patent: Jan. 23, 1990

[54] VARIABLE-CAPACITY EXHAUST GAS TURBINE SUPERCHARGER

[75] Inventor: Haruyoshi Tsubouchi, Katsuta, Japan

[73] Assignee: Hitachi, Ltd., Tokyo, Japan

[21] Appl. No.: 251,818

[22] Filed: Oct. 3, 1988

[30] Foreign Application Priority Data

Oct. 5, 1987 [JP] Japan .................. 62-249826

[51] Int. Cl.$^4$ ............................................ F02B 37/12
[52] U.S. Cl. ...................................... 60/602; 415/116; 415/151
[58] Field of Search ............... 60/600, 601, 602, 603, 60/605.1; 415/116, 151, 154, 155; 417/407

[56] References Cited

U.S. PATENT DOCUMENTS

| 3,270,495 | 9/1966 | Connor | 60/602 |
| 4,653,275 | 3/1987 | Sumser et al. | 60/602 |
| 4,776,168 | 10/1988 | Woollenweber | 60/602 |

FOREIGN PATENT DOCUMENTS

| 114844 | 8/1983 | Japan | 60/602 |
| 1278903 | 6/1972 | United Kingdom . | |
| 1554074 | 10/1979 | United Kingdom . | |

Primary Examiner—Michael Koczo
Attorney, Agent, or Firm—Antonelli, Terry & Wands

[57] ABSTRACT

A variable-capacity exhaust gas turbine supercharger comprises a radial turbine and a compressor driven by the turbine. The turbine has a scroll portion divided into an open scroll chamber and a closed scroll chamber. The open scroll chamber directly communicates with an engine manifold and has a nozzle portion facing circumferential portions of turbine blades. The closed scroll chamber communicates with the engine manifold via a change-over valve and has an annular opening opened to rear portions of the turbine blades, and a nozzle portion having a plurality of gas passages defined by stationary guide vanes is provided between the annular opening of the second scroll chamber and the rear portion of the turbine blades.

5 Claims, 2 Drawing Sheets

VARIABLE-CAPACITY EXHAUST GAS TURBINE SUPERCHARGER

BACKGROUND OF THE INVENTION

This invention relates to an exhaust gas turbine supercharger for an internal combustion engine and, more particularly, to a variable-capacity turbine supercharger provided with a capacity control mechanism for controlling supercharging capacity in accordance with the operational condition of the engine.

In for example, U.S. Pat. No. 3,270,495, a conventional variable-capacity exhaust gas turbine supercharger of the aforementioned type has a turbine housing divided into, first and second scrolls by an inner wall thereof, and the nozzle portion of each scroll is opened in opposition to the circumferential surface of a turbine blade. The first scroll is joined directly to an exhaust manifold, and the second scroll is joined to the exhaust manifold via a control valve. The control valve is adapted to control the capacity by closing the inlet of the second scroll when the flow rate of exhaust gas is low, and by opening the inlet of the second scroll when the flow rate of the exhaust gas is high.

The aforementioned supercharger is designed so that the pressure of exhaust gas flowing at a high flow rate with the engine rotated at a high speed can be reduced, by reducing the cross-sectional area of a passage in a so-called open scroll connected directly to an exhaust manifold, securing a supercharging pressure when the exhaust gas flows at a low flow rate with the engine rotated at a low speed, and increasing to as great an extent as possible the cross-sectional area of a passage in a so-called closed scroll. However, no consideration is given to the areas of the openings of the nozzle portions of the scrolls. If the cross-sectional area of the passage in the closed scroll is decreased, a choking phenomenon occurs in the nozzle portion thereof to cause the turbine efficiency to decrease, and the exhaust gas pressure to increase.

SUMMARY OF THE INVENTION

An object of the present invention is to prevent a choking phenomenon from occurring in the nozzle portions of the scrolls and improve the turbine efficiency across a wide range from a low flow rate of the exhaust gas to a high flow rate thereof.

This object can be achieved by opening the nozzle portion of an open scroll so that the nozzle portion is opposed to the circumferential portion of a blade of a radial turbine, and opening the nozzle portion of a closed scroll so that this nozzle portion is opposed to the rear portion of the blade of the radial turbine.

According to the present invention thus constructed, the exhaust gas flows from the circumferential portion of the turbine blade only when the flow rate of the exhaust gas is low, and from the rear portion and circumferential portion of the turbine blade when the flow rate of the exhaust gas is high. Therefore, the areas of the openings of the nozzle portions can be set independently to such levels that suit the characteristics required by the relative scrolls. This enables the area of the opening of the nozzle portion of the closed scroll to be also set sufficiently large. Consequently, a choking phenomenon does not occur, and the turbine efficiency is improved.

DETAILED DESCRIPTION

Figure 1:
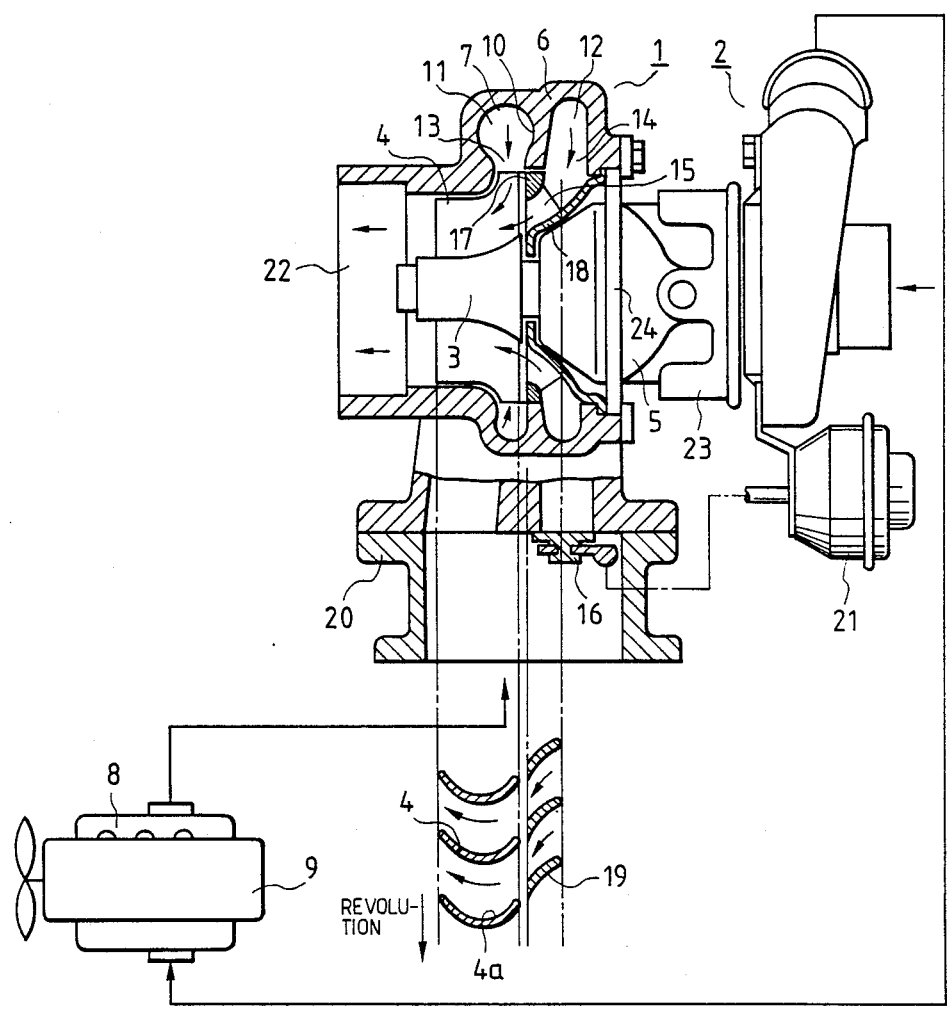
FIG. 1 is a sectional view of an embodiment of the present invention.

Referring now to the drawings and, more particularly, to FIG. 1, according to this figure the variable-capacity exhaust gas turbine supercharger comprises a radial turbine generally designated by the reference numeral 1 and a compressor generally designated by the reference numeral 2 which are secured to the same shaft (not shown), with the compressor 2 being driven by the radial turbine 1. The radial turbine 1 comprises a turbine wheel 3 which has a plurality of blades 4 and is rotatably supported by a bearing box 5 in which a bearing is disposed for supporting a shaft of the turbine wheel 3, and a casing 6 enclosing therein the turbine wheel 3. The casing 6 has a scroll portion 7 communicating with an exhaust manifold 8 of an engine 9 and a partition 10 dividing the interior of the scroll portion 7 into two parts, that is, a so-called open scroll 11, and a so-called closed scroll 12. The open scroll 11 is provided with a nozzle portion 13 having an annular opening, one end of which communicates directly with the exhaust manifold 8, and the other end of which is opened so as to be opposed to the circumferential portion of the turbine blade 4, and the closed scroll 12 is provided with an annular opening 14. Between the annular opening 14 and a rear side of the turbine blades 4, a nozzle portion 15 is formed, one end of the nozzle portion 15 being joined to the exhaust manifold 8 via a change-over valve 16, the other end of the nozzle portion 15 being opened so as to be opposed to the rear surface of the turbine blade 4.

The nozzle portion 15 comprises an outer ring 17, an inner ring 18 and a plurality of stationary guide vanes 19 disposed therebetween.

The high-temperature exhaust gas discharged from the engine 9 is collected in the exhaust manifold 8 and introduced into an inlet 20 of the turbine 1. When the engine 9 is rotated at a low speed with the exhaust gas flowing at a low rate, the change-over valve 16 is closed by an actuator 21, and the exhaust gas is introduced wholly into the open scroll 11. The resultant exhaust gas is forced from the circumference of the turbine blade 4 to the center thereof via the nozzle portion 13, and flows out into a discharge port 22.

In an intermediate speed region of the engine 9, the changeover valve 16 is opened gradually by the actuator 21. When the change-over valve 16 is opened, a part of the exhaust gas flows into the closed scroll 12, and forced from the rear surface of the radial turbine blade 4 toward the center thereof as the exhaust gas is guided by the stationary guide vanes 19 in the nozzle portion 15, with the exhaust gas then flowing to the discharge port 22. Consequently, the number of revolutions per minute of the turbine blade 4 increases to cause the number of revolutions per minute of the compressor 2 to increase, so that the supercharging pressure increases. In a high speed region of the engine 9, the change-over valve 16 is fully opened by the actuator 21, and the greater part of the exhaust gas flows from the rear surface of the turbine blade 4 via the nozzle portion 15 to the discharge port 22.

Figure 2:
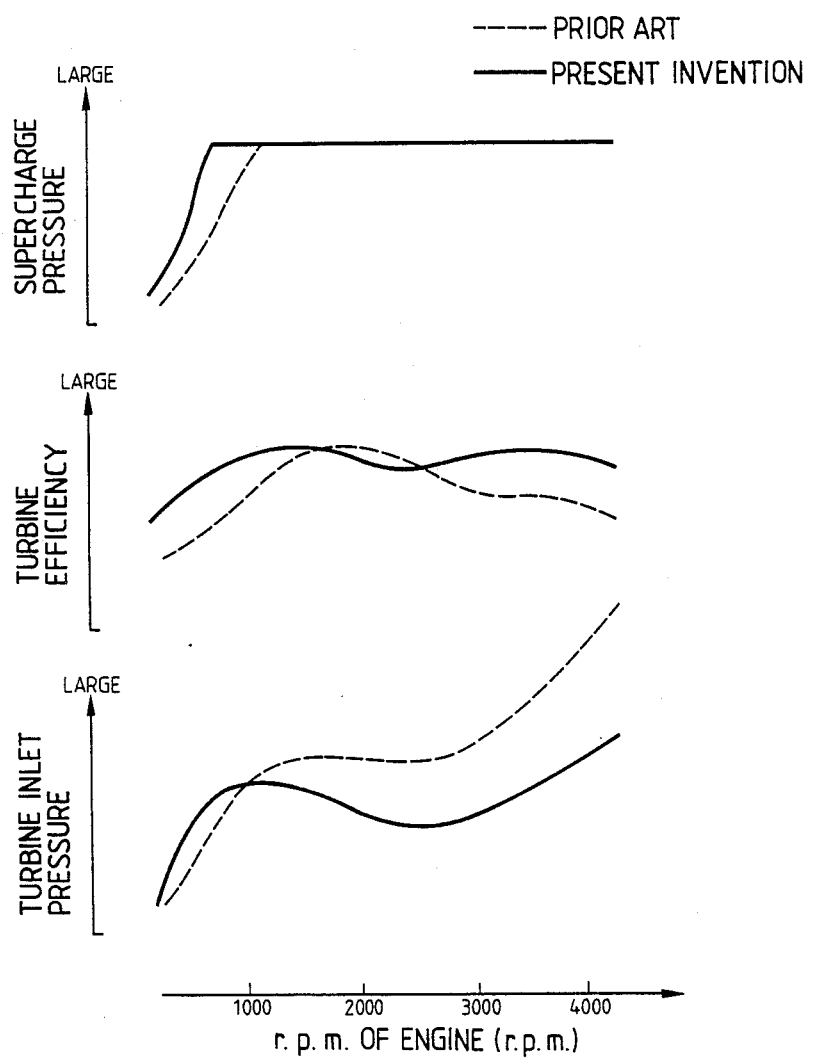
FIG. 2 is a graphical illustration for comparison showing the performance of the embodiment of the present invention and a prior art exhaust gas turbine supercharger.

The area of the opening of the nozzle portion 13 of the open scroll 11 and the width of the portion of the turbine blade 4 which is opposed to the nozzle portion 13 can be reduced sufficiently in accordance with the flow rate of the exhaust gas during a low-speed operation of the engine 9. This enables the turbine efficiency in a low-speed region to be improved to a great extent as shown in FIG. 2.

The area of the opening of the nozzle portion 15 of the closed scroll 12 can be set sufficiently large within the range of the diametrical size of the rear surface of the turbine blade 4 completely irrespective of the width of that portion of the turbine blade 4 which is opposed to the nozzle portion 13 of the closed scroll 11. Accordingly, even when the flow rate of the exhaust gas becomes very high, the pressure at the inlet 20 of the turbine 1 can be controlled to a low level, so that a choking phenomenon does not occur in the nozzle portion. Therefore, the lowering of the turbine efficiency in a high flow rate region can be minimized.

The nozzle portion 15, which is provided with the stationary guide vane 19, of the closed scroll 12 is formed integrally with the outer circumference of the central end of the inner ring 18, which is made of a heat shielding member, which is held between a center housing 23 and the turbine casing 6 by a holding plate 24, in such a manner that a part of the shielding member 18 forms a part of the scroll 7. The nozzle portion 15 and shielding member 18 may also be formed separately with the guide vane 19 held by the holding plate 24 and shielding member 18.

The guide vane 19 only may be formed separately and welded to the inner circumference of the partition 10.

The bearing box 5 is fixed to the turbine casing by the holding plate 24 so that the turbine wheel 3 is rotatably supported by the turbine casing 6.

As shown in FIG. 1, the direction in which the guide vane 19 is curved is opposite to that in which the radial turbine blade 4 is curved. Accordingly, the exhaust gas flowing from the guide vane is forced toward a bottom portion 4a of the curved surface of the turbine blade 4, so that the working force can be transmitted wastelessly to the turbine 1 thereby serving to improve the turbine efficiency.

Bypass passages capable of discharging the exhaust gas from the intermediate portions of the open and closed scrolls 11, 12 to the discharge port 22 directly without causing the exhaust gas to flow toward the turbine blade 4 can also be provided so as to bypass a part of the exhaust gas, which flows to the turbine blade 4 when the flow rate of the exhaust gas is so high as to cause a choking phenomenon to occur, to the discharge port 22 by controlling this bypass passage by a valve. In this case, an overall supercharging pressure can be set higher.

According to the present invention, the nozzle portion of the closed scroll is formed on the rear surface of the turbine blade so that the area of the opening thereof into which the exhaust gas flows can be set large. Therefore, a choking phenomenon which is liable to occur when the flow rate of the exhaust gas is high, and hence the lowering of the turbine efficiency can be prevented.

What is claimed is:

1. A variable-capacity exhaust gas turbine supercharger having a radial turbine and a compressor fixedly mounted on a same shaft, and a partition means provided in a casing of said radial turbine for dividing an interior of a scroll portion of said casing into two scroll chambers, one of said scroll chambers is in constant communication with an exhaust manifold to form an open scroll chamber, a control valve means is provided in said exhaust manifold for interrupting communication between the other of said scroll chambers and the exhaust manifold when a flow rate of an exhaust gas in said exhaust manifold is lower than a certain value thereby forming a closed scroll chamber and permitting the closed scroll chamber to communicate with said exhaust manifold when the flow rate of the exhaust gas is higher than the certain value, said open scroll chamber having an opening disposed in opposition to a circumferential portion of turbine blades of said radial turbine, said closed scroll chamber having an opening disposed in opposition to a rear surface of said turbine blades as viewed in a direction of flow of the exhaust gas through the radial turbine, and wherein a plurality of guide vanes are provided between said opening of said closed scroll chamber and said rear surface of said turbine blades so that the guide vanes directly face said rear surface of said turbine blades.

2. A variable-capacity exhaust gas turbine supercharger according to claim 1, wherein an outer ringmeans for mounting said guide vanes is provided between said opening of said closed scroll chamber and said rear surface of said turbine blade so as to cover an outer portion of said rear surface of said turbine blades thereby guiding exhaust gas along a substantially axial flow.

3. A variable capacity exhaust gas turbine supercharger comprising a compressor and a radial turbine means connected to said compressor for driving said compressor, said radial turbine means including a turbine wheel having blades, and a casing means for enclosing said turbine wheel and having a scroll portion and a partition means for dividing an interior of said scroll portion into a first and a second scroll each having an annular opening, said first scroll communication with an exhaust manifold of an engine and said second scroll communicating with said exhaust gas manifold through a change-over valve when a flow rate of an exhaust gas in said exhaust manifold is higher than a certain value and interrupting the communication with the exhaust gas manifold when the flow rate is lower than the certain value, said annular opening of said first scroll chamber is opened to a circumferential portion of said turbine wheel so as to radially and inwardly introduce exhaust gas into said blades and said annular opening of said second scroll is open to a rear surface of the blades of said turbine wheel as viewed in a direction of flow of exhaust gas through the radial turbine means, a nozzle portion is provided between said annular opening of said second scroll and a rear surface of said blades, said nozzle portion comprising an outer ring means positioned to cover said rear surface of said blades on a peripheral side of said blades, an inner ring means and a plurality of guide vane means are disposed between said inner ring means and said outer ring means thereby enabling an introduction of the exhaust gas substantially axially into said blades.

4. A variable-capacity exhaust gas turbine supercharger according to claim 3, wherein said inner ring means includes a heat insulating member secured to said casing means and forming a part of said scroll portion.

5. A variable-capacity exhaust gas turbine supercharge according to claim 3, wherein said guide vane means are each curved in an opposite direction to a curved direction of each of said blades.

* * * * *